United States Patent
Wang et al.

(10) Patent No.: US 9,756,591 B2
(45) Date of Patent: Sep. 5, 2017

(54) SYNCHRONIZATION IN THE PRESENCE OF LARGE INITIAL FREQUENCY ERROR

(71) Applicant: Telefonaktiebolaget L M Ericsson (publ), Stockholm (SE)

(72) Inventors: Yi-Pin Eric Wang, Fremont, CA (US); Bo Hagerman, Tyresö (SE); Ali S. Khayrallah, Mountain View, CA (US); Michael Samuel Bebawy, Santa Clara, CA (US); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 156 days.

(21) Appl. No.: 14/663,113

(22) Filed: Mar. 19, 2015

(65) Prior Publication Data
US 2016/0278036 A1    Sep. 22, 2016

(51) Int. Cl.
*H04W 56/00* (2009.01)
*H04L 27/26* (2006.01)
*H04W 4/00* (2009.01)

(52) U.S. Cl.
CPC ..... *H04W 56/0035* (2013.01); *H04L 27/2656* (2013.01); *H04L 27/2659* (2013.01);
(Continued)

(58) Field of Classification Search
None
See application file for complete search history.

(56) References Cited

U.S. PATENT DOCUMENTS

| 2011/0135022 A1* | 6/2011 | Dell' Amico | ......... H04L 25/022 375/260 |
| 2015/0139219 A1* | 5/2015 | Young | ................. H04L 27/0014 370/350 |

(Continued)

FOREIGN PATENT DOCUMENTS

| GB | WO 2015092365 A1 * | 6/2015 | ........... H04B 1/7087 |
| JP | WO 2014132599 A1 * | 9/2014 | ............. H04L 27/22 |

OTHER PUBLICATIONS

3GPP TSG RAN WG1 Meeting #78; Dresden, Germany; Source: Huawei, HiSilicon; Title: Remaining details of D2D synchronization signals (R1-142843)—Aug. 18-21, 2014.

(Continued)

*Primary Examiner* — Mohammad Adhami
*Assistant Examiner* — Vladislav Agureyev
(74) *Attorney, Agent, or Firm* — Baker Botts, LLP

(57) ABSTRACT

A method for synchronization in a network node is disclosed. The method comprises determining an N-symbol slice of a received signal, the N-symbol slice corresponding to a sync point hypothesis, dividing the N-symbol slice into one or more segments, each of the one or more segments having the same symbol length, and determining one or more phase rotation operators for each of the one or more segments, the determined one or more phase rotation operators compensating for a phase rotation introduced by an initial frequency error. The method further comprises performing coherent correlation within each of the one or more segments using the determined one or more phase rotation operators, and performing differentially coherent correlation on each of the one or more segments.

28 Claims, 9 Drawing Sheets

(52) U.S. Cl.
CPC .......... *H04W 4/008* (2013.01); *H04W 56/00* (2013.01); *H04L 27/2675* (2013.01)

(56) References Cited

U.S. PATENT DOCUMENTS

2015/0358192 A1* 12/2015 Nilsson ............... H04L 25/0222
375/349
2016/0006557 A1* 1/2016 Shirakawa .............. H04L 27/22
375/362

OTHER PUBLICATIONS

3GPP TSG RAN WG1 Meeting #79; San Francisco, USA; Source: Lenovo; Title: D2D Synchronization Signal and Channel Design (R1-144761)—Nov. 17-21, 2014.

PCT Notification of Transmittal of the International Search Report and the Written Opinion of the International Searching Authority, or the Declaration for International application No. PCT/IB2016/051462—May 31, 2016.

* cited by examiner

SYNCHRONIZATION IN THE PRESENCE OF LARGE INITIAL FREQUENCY ERROR

TECHNICAL FIELD

The present disclosure relates, in general, to wireless communications, and, more particularly, to synchronization in the presence of large initial frequency error.

BACKGROUND

In the Bluetooth Special Interest Group (SIG), a new feature, Bluetooth Low Energy (BLE) Long Range (BLR), is being standardized. Forward error correction (FEC) coding, spreading, and/or coherent demodulation are being introduced to the Bluetooth standard for receiver implementation to improve receiver sensitivity and range. To fully take advantage of these improvements, it is important that the receiver has good synchronization performance. Without good synchronization performance, the performance may be limited by synchronization error.

Achieving synchronization at low signal-to-noise ratio (SNR) is challenging in BLE. This is because the radio requirements are very relaxed, and the initial frequency offset at the transmitter may be as large as 50 ppm. This translates to 150 kHz frequency offset at the transmitter. In combination, the frequency offset at the transmitter and receiver can result in a very large initial frequency error. Furthermore, a frequency drift up to +/−50 kHz may add to the initial frequency error. Many technologies that adopt low-cost radio front ends having relaxed accuracy requirements face similar challenges when they extend the range to work at low SNR.

Existing approaches to accommodate a large initial frequency error perform initial time synchronization in a receiver based on differential detection, which may be implemented using a phase discriminator. These approaches may have certain deficiencies. For example, such a time synchronizer has limited sensitivity, and cannot operate at low SNR. This is especially true in the region where noise power is stronger than the desired signal power, i.e., where SNR is less than 0 dB. Thus, there is a need for a method of acquiring synchronization at low SNR in the presence of large initial frequency error.

SUMMARY

To address the foregoing problems with existing solutions, disclosed is a method for synchronization in a network node. The method comprises determining an N-symbol slice of a received signal, the N-symbol slice corresponding to a sync point hypothesis, dividing the N-symbol slice into one or more segments, each of the one or more segments having the same symbol length, and determining one or more phase rotation operators for each of the one or more segments, the determined one or more phase rotation operators compensating for a phase rotation introduced by an initial frequency error. The method further comprises performing coherent correlation within each of the one or more segments using the determined one or more phase rotation operators, and performing differentially coherent correlation on each of the one or more segments.

In certain embodiments, the network node may comprise a Bluetooth Low Energy Long Range receiver. Determining one or more phase rotation operators for each of the one or more segments may comprise determining an initial frequency error interval, dividing the determined initial frequency error interval into one or more frequency error hypotheses, determining a phase rotation for each of the one or more frequency error hypotheses, and quantizing the determined phase rotation for each of the one or more frequency error hypotheses. The frequency error interval may comprise a frequency offset and a frequency drift. Quantizing the determined phase rotation for each of the one or more frequency error hypotheses may comprise quantizing to four points on the same unit circle, the four points comprising 1, −1, j, and −j. The step of performing coherent correlation within each of the one or more segments using the determined one or more phase rotation operators may boost an effective signal-to-noise ratio of the received signal by a processing gain.

In certain embodiments, the N-symbol slice corresponding to the sync point hypothesis may be one of a plurality of N-symbol slices. Each N-symbol slice may have a corresponding sync point hypothesis. The method may further comprise performing, for each of the plurality of N-symbol slices, the steps of dividing the N-symbol slice into one or more segments, determining one or more phase rotation operators for each of the one or more segments, performing coherent correlation within each of the one or more segments using the determined one or more phase rotation operators, and performing differentially coherent correlation on each of the one or more segments. The method may further comprise determining a frequency error hypothesis and sync point hypothesis combination having a largest time synchronization metric as a frequency error estimate and a time sync point. The time synchronization metric may be a correlation value. The correlation value may be based at least in part on a comparison of one of the plurality of N-symbol slices and a sync word of the received signal. The method may further comprise determining one or more symbols corresponding to the sync word of the received signal based at least in part on a modulation index of the received signal.

Also disclosed is a network node. The network node comprises one or more processors. The one or more processors are configured to determine an N-symbol slice of a received signal, the N-symbol slice corresponding to a sync point hypothesis, divide the N-symbol slice into one or more segments, each of the one or more segments having the same symbol length, and determine one or more phase rotation operators for each of the one or more segments, the determined one or more phase rotation operators compensating for a phase rotation introduced by an initial frequency error. The one or more processors are configured to perform coherent correlation within each of the one or more segments using the determined one or more phase rotation operators, and perform differentially coherent correlation on each of the one or more segments.

Also disclosed is a method for synchronization in a user equipment. The method comprises determining an N-symbol slice of a received signal, the N-symbol slice corresponding to a sync point hypothesis, dividing the N-symbol slice into one or more segments, each of the one or more segments having the same symbol length, and determining one or more phase rotation operators for each of the one or more segments, the determined one or more phase rotation operators compensating for a phase rotation introduced by an initial frequency error. The method further comprises performing coherent correlation within each of the one or more segments using the determined one or more phase rotation operators, and performing differentially coherent correlation on each of the one or more segments.

In certain embodiments, the user equipment may comprise a Bluetooth Low Energy Long Range receiver. Determining one or more phase rotation operators for each of the one or more segments may comprise determining an initial frequency error interval, dividing the determined initial frequency error interval into one or more frequency error hypotheses, determining a phase rotation for each of the one or more frequency error hypotheses, and quantizing the determined phase rotation for each of the one or more frequency error hypotheses. The frequency error interval may comprise a frequency offset and a frequency drift. Quantizing the determined phase rotation for each of the one or more frequency error hypotheses may comprise quantizing to four points on the same unit circle, the four points comprising 1, −1, j, and −j. The step of performing coherent correlation within each of the one or more segments using the determined one or more phase rotation operators may boost an effective signal-to-noise ratio of the received signal by a processing gain.

In certain embodiments, the N-symbol slice corresponding to the sync point hypothesis may be one of a plurality of N-symbol slices. Each N-symbol slice may have a corresponding sync point hypothesis. The method may further comprise performing, for each of the plurality of N-symbol slices, the steps of dividing the N-symbol slice into one or more segments, determining one or more phase rotation operators for each of the one or more segments, performing coherent correlation within each of the one or more segments using the determined one or more phase rotation operators, and performing differentially coherent correlation on each of the one or more segments. The method may further comprise determining a frequency error hypothesis and sync point hypothesis combination having a largest time synchronization metric as a frequency error estimate and a time sync point. The time synchronization metric may be a correlation value. The correlation value may be based at least in part on a comparison of one of the plurality of N-symbol slices and a sync word of the received signal. The method may further comprise determining one or more symbols corresponding to the sync word of the received signal based at least in part on a modulation index of the received signal.

Also disclosed is a user equipment. The user equipment comprises one or more processors. The one or more processors are configured to determine an N-symbol slice of a received signal, the N-symbol slice corresponding to a sync point hypothesis, divide the N-symbol slice into one or more segments, each of the one or more segments having the same symbol length, and determine one or more phase rotation operators for each of the one or more segments, the determined one or more phase rotation operators compensating for a phase rotation introduced by an initial frequency error. The one or more processors are configured to perform coherent correlation within each of the one or more segments using the determined one or more phase rotation operators, and perform differentially coherent correlation on each of the one or more segments.

Certain embodiments of the present disclosure may provide one or more technical advantages. For example, certain embodiments may allow a receiver to acquire synchronization at low SNR, and in the presence of a large initial frequency error. As another example, the use of quantized phase rotation operators may result in reduced complexity at the receiver. As yet another example, reliable synchronization may be achieved with low complexity receiver operations. Other advantages of the present disclosure may be apparent to one of ordinary skill of the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, achieving synchronization at low SNR, such as in BLE, can be challenging, especially in the presence of large initial frequency error. The present disclosure contemplates various embodiments that may improve the sensitivity of synchronization, and may allow synchronization at low SNR in the presence of large initial frequency error. In certain embodiments, a hybrid approach including coherent and differentially coherent synchronization may be used. For example, coherent operation may be employed to boost the effective SNR by a processing gain through coherent combining of the received signal. Differentially coherent correlation may be subsequently applied to the outputs of the coherent combining stage to produce a decision metric for synchronization. There may be one decision metric for each of one or more synchronization point hypothesis. In certain embodiments, during the coherent combining stage phase rotation operators are applied to the received signal according to a number of frequency hypotheses. The phase rotation operators may be limited to a small set of quantized values, e.g., {1, −1, j, −j} for ease of implementation of phase rotation operation. Although certain embodiments are described in terms of time synchronization, this is for purposes of example only. The present disclosure contemplates that the various embodiments may have a variety of suitable application, including, for example, frequency synchronization.

Figure 1:
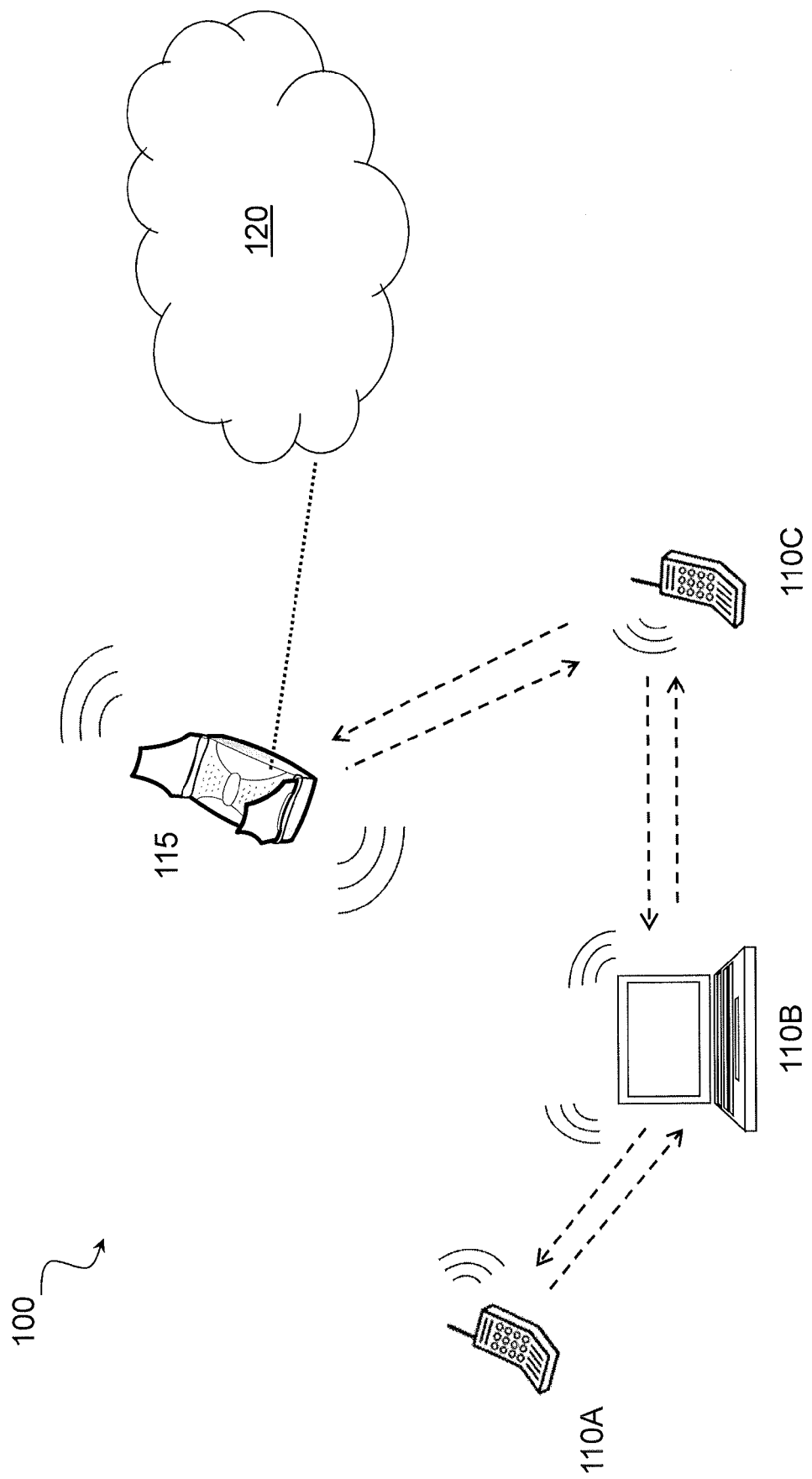
FIG. 1 is a block diagram illustrating an embodiment of a wireless communications network, in accordance with certain embodiments.

FIG. 1 illustrates a wireless communications network 100, in accordance with certain embodiments. Network 100 includes a plurality of wireless devices 110A, 110B, 110C, one or more network node(s) 115, and other network 120. Wireless communications network 100 may operate based on any suitable radio access technology. Wireless communications network 100 may operate over any suitable range. Although FIG. 1 illustrates a particular configuration of wireless communications network 100, the present disclosure contemplates that wireless communications network 100 may include any suitable number of wireless devices 110 and any suitable number of network nodes 115.

Wireless devices 110 may also be referred to as stations (STA) or user equipment (UE). Wireless devices 110 may communicate with network node 115 or other wireless device 110 over a wireless interface. For example, wireless devices 110 may transmit wireless signals to network node 115 or other wireless devices 110, and/or receive wireless signals from network node 115 or other wireless devices 110. The wireless signals may contain voice traffic, data traffic, control signals, and/or any other suitable information. In certain embodiments, wireless devices 110 may be BLE and/or BLR capable. Thus, wireless devices 110 may include any suitable configuration of hardware and/or software for performing the various functionalities of BLE and/or BLR. For example, wireless devices 110 may include a receiver for receiving signals and one or more processors configured to determine a synchronization point for the received signal. In certain embodiments, the wireless signals may be communicated in short bursts. The bursts may contain information useful for facilitating initial time and/or frequency synchronization, such as, for example, a synchronization (sync) word. An example format of a burst is described in more detail below in relation to FIG. 2.

In certain embodiments, network node 115 may allow wireless devices, such as wireless devices 110A, 110B, and 110C to communicate wirelessly and to connect to another network 120. The other network 120 may be any suitable network, such as an organization's wired infrastructure or the Internet. Network node 115 may have an associated coverage area. Wireless devices 110A-C located within a coverage area of network node 115 may be able to communicate with network node 115. In certain embodiments, network node 115 may be BLE and/or BLR capable. Thus, network node 115 may include any suitable configuration of hardware and/or software for performing the various functionalities of BLE and/or BLR. For example, network node 115 may include a receiver for receiving signals and one or more processors configured to determine a synchronization point for the received signal. Example embodiments of wireless device 110 and network node 115 are described below with respect to FIGS. 8 and 9, respectively.

In operation, a BLE and/or BLR capable receiver of wireless device 110 and/or network node 115 may receive a signal. The received signal may have a large initial frequency error. Thus, there may be an unknown timing difference between the received signal and transmitted signals, and time synchronization may need to be performed. To perform time synchronization of the received signal, an N-symbol slice of the received signal corresponding to a sync point hypothesis may be divided into one or more segments. One or more phase rotation operators may be determined for each of the one or more segments. In determining the phase rotation operators, a phase rotation may be determined for one or more frequency error hypotheses. Coherent correlation may be performed on the one or more segments using the determined phase rotation operators. Differentially coherent correlation may be performed. In certain embodiments, these steps may be performed on a plurality of N-symbol slices, and each N-symbol slice may correspond to a sync point hypothesis. The frequency error hypothesis and sync point hypothesis combination having the largest time synchronization metric may be determined as the time synchronization point.

Figure 2:
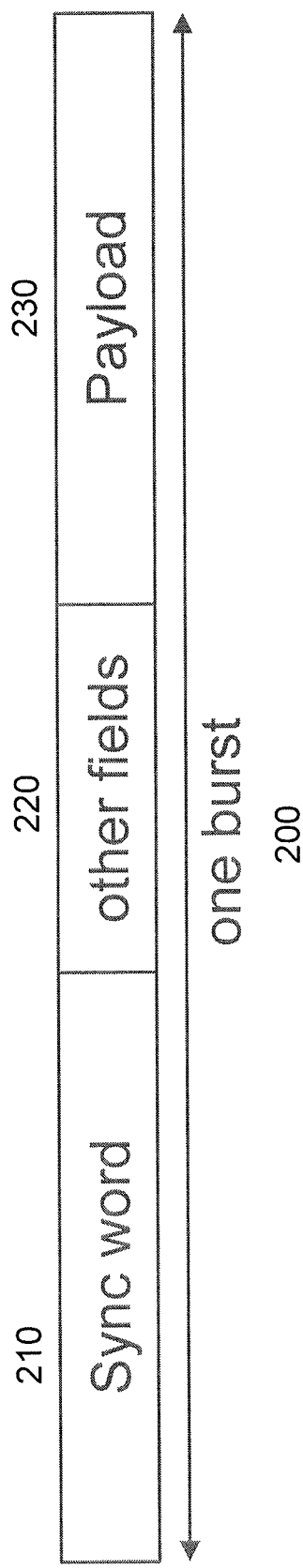
FIG. 2 illustrates an example format of a burst, in accordance with certain embodiments.

FIG. 2 illustrates an example format of a burst 200, in accordance with certain embodiments. The format of a burst 200 may be used in many technologies, such as, for example, BLE and BLR. The format includes sync word 210, other fields 220, and payload 230. Sync word 210 is located at the beginning of burst 200. Sync word 210 may contain known symbols, and may be used for facilitating initial time synchronization. In some cases, sync word 210 may also be used for frequency synchronization. In certain embodiments, to perform time and/or frequency synchronization an N-symbol slice of a received signal that matches sync word 210 may be determined.

Other fields 220 may include any suitable type of information. For example, other fields 220 of burst 200 may include control channel information, information about a common link, a receiver address, a modulation encoding scheme, or information regarding payload 230. Payload 230 may contain any suitable type of information. For example, payload 230 may contain user data.

As described above, burst 200 may contain information about a modulation encoding scheme. Wireless technologies may use any suitable modulation schemes in communicating wireless signals. For example, in certain embodiments, BLE/BLR may use a Gaussian frequency-shift keying (GFSK) modulation scheme. Some modulation schemes used by wireless technologies, such as the GFSK modulation scheme, may use a modulation index that results in phase changes to modulated symbols based on the bit input to a modulator. In certain embodiments, this feature of some modulation schemes may need to be accounted for to perform synchronization.

Figure 3:
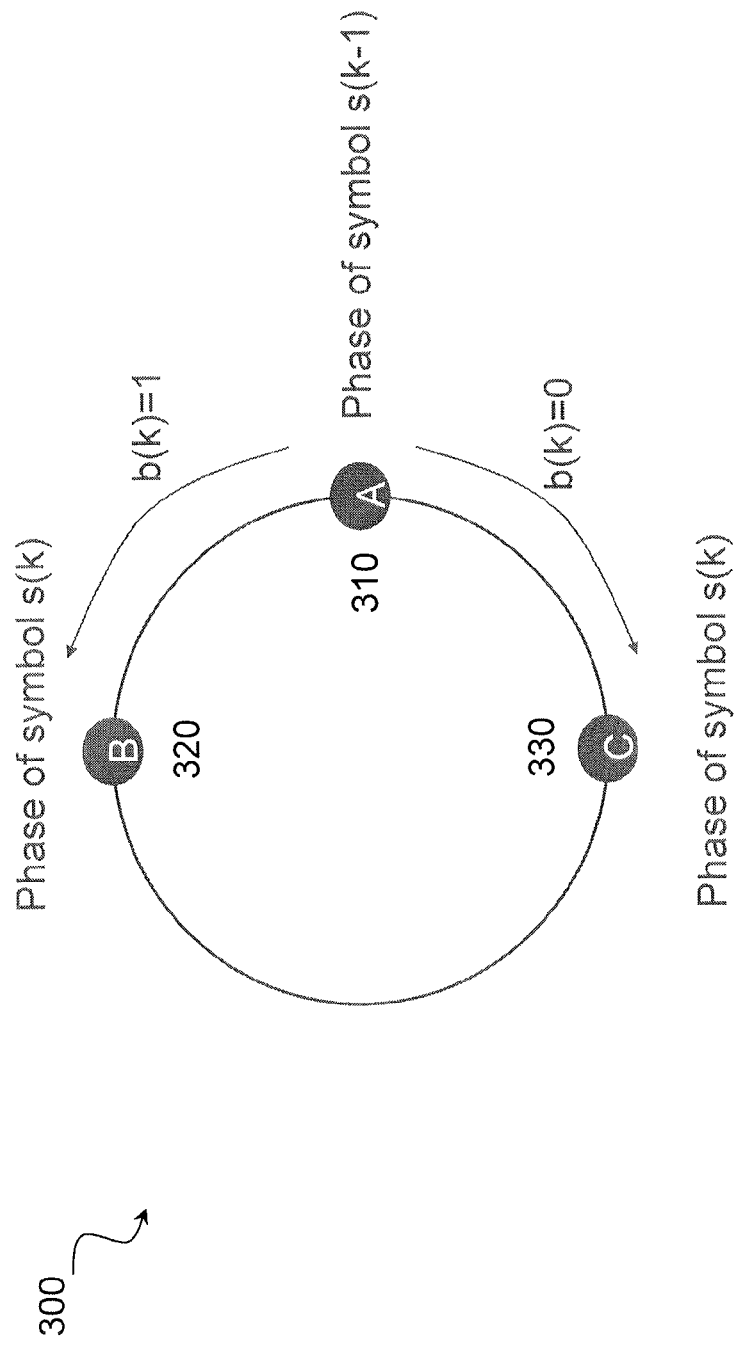
FIG. 3 illustrates phase rotation from symbol to symbol according to Gaussian frequency-shift key as used in BLE and BLR, in accordance with certain embodiments.

FIG. 3 illustrates phase rotation from symbol to symbol according to GFSK as used in BLE and BLR, in accordance with certain embodiments. As an example, the GFSK used in BLE/BLR uses a modulation index h=1/2, which gives a phase change of $\pi/2$ when the bit input to the modulator has a value of b(k)=1, and a phase change of $-\pi/2$ when the bit input to the modulator has a value of b(k)=0. As shown in FIG. 3, the phase of the modulated symbol at symbol period k−1 is represented by point A 310 in the I-Q diagram 300. When the bit input to the modulator in the next symbol period has value 1, a phase change of $\pi/2$ brings the modulated symbol to point B 320. However, if the bit input to the modulator in the next symbol period has value 0, a phase change of $-\pi/2$ brings the modulated symbol to point C 330. Regardless, the modulated symbol in symbol period k is determined by the modulated symbol in symbol period k−1, and the bit input to the modulator in symbol period k. This GFSK property needs to be accounted for when coherent accumulation is performed in the time synchronization process.

For example, let b(k) be the k-th bit of the sync word, b(k)=0, or 1. In such a case, the GFSK symbols is:

$$s(k) = j^k \prod_{l=0}^{k} (2b(l)-1)$$

Thus, using the GFSK property and knowing the binary values of the bits in the sync word, the modulation symbol values corresponding to the sync word can be inferred. The receiver can use the knowledge of s(k) to perform coherent combining or correlation for achieving time synchronization. Note that the term j in the above equation corresponds to the $\pi/2$ rotation illustrated in FIG. 3 since $e^{j\pi/2}=\pi/2$. Thus, the GFSK symbols corresponding to the sync word are determined based on the property of the modulation. For example, the knowledge of modulation index h=1/2 is used in the above equation in determining the GFSK symbols corresponding to the sync word.

The received signal can be represented by the Equation (1):

$$r(k)=s(k-k_0)e^{j2\pi(k-k_0)f_0T_s+\theta}+n(k-k_0), \quad (1)$$

where $f_0$ represents the initial frequency error, $T_s$ is the symbol duration, $\theta$ is a random initial phase, and n(k) is contributed by additive white Gaussian noise (AWGN) or interference. The value $k_0$ represents the unknown timing difference between the received and transmitted signals. The objective of time synchronization is to identify the value of $k_0$.

Figure 4:
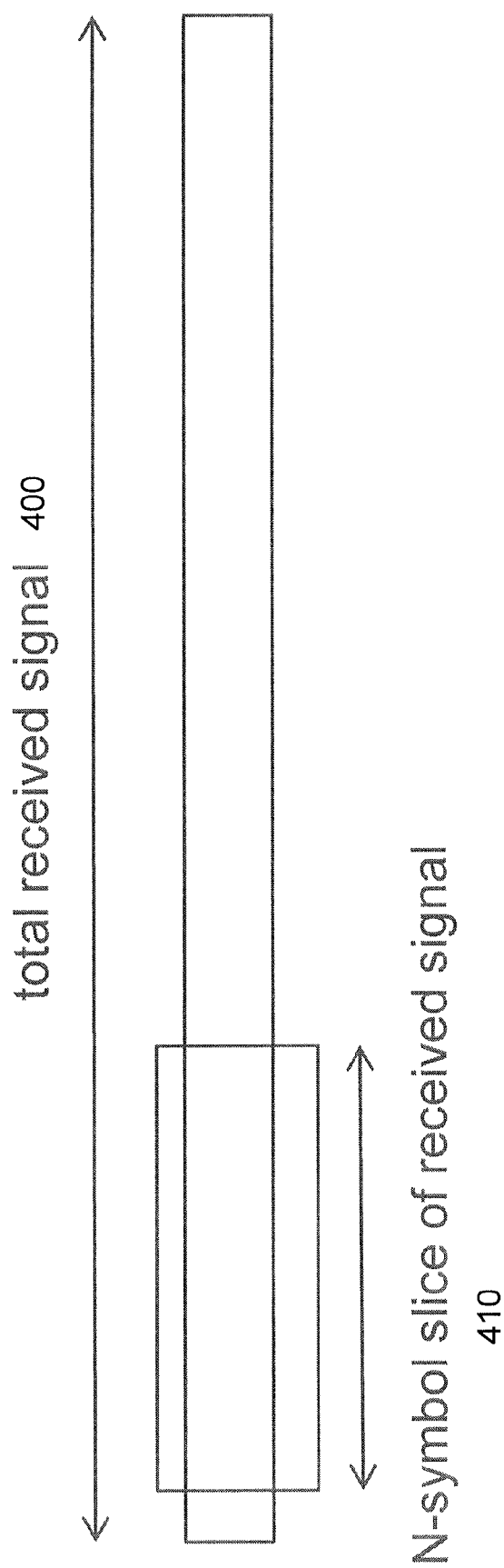
FIG. 4 illustrates an N-symbol slice of a received signal, in accordance with certain embodiments.

FIG. 4 illustrates an N-symbol slice 410 of a received signal 400, in accordance with certain embodiments. As described above, to perform time and/or frequency synchronization an N-symbol slice of received signal 400 that matches the sync word of received signal 400 may be determined, where N is the length of the sync word. In certain embodiments, a plurality of N-symbol slices may be determined, and each N-symbol slice may correspond to a sync point hypothesis. In such an embodiment, to achieve time synchronization the N-symbol slice 410 of the plurality of N-symbol slices of received signal 400 must be identified that matches with the sync word signal. Let c(m) be a time synchronization metric for the m-th sync point hypothesis, where $$c(m)=|\Sigma_{k=0}^{N-1}r(k+m)s^*(k)|. \quad (2)$$

The synchronization metric may be a correlation value. The correlation value may be based at least in part on a comparison of one of the plurality of N-symbol slices 410 and a sync word, such as sync word of the received signal 400. The presence of initial frequency error, however, may make the time synchronization metric small, even when m=$k_0$.

In certain embodiments, the process of correlating N-symbol slice 410 of received signal 400 with the sync word of the received signal, such as sync word 210 described above, can be broken into a combination of coherent correlation and differentially coherent correlation. The equations for differentially coherent correlation and coherent correlation are defined below by Equations (3) and (4), respectively.

$$c_i(m) = \left| \sum_{k=0}^{\frac{N}{4}-1} x_i(k)x_i^*(k-1) \right|, \quad (3)$$

$$x_i(k)=\Sigma_{l=0}^{3}r(4k+l+m)s^*(4k+l)\phi_i(l). \quad (4)$$

In Equation (3) above, $c_i(m)$ is the time synchronization metric according to the m-th sync point and i-th frequency error hypothesis. In certain embodiments, an alternative time synchronization metric may be obtained by taking the real part of the summation in Equation (3), $$c_i(m) = \text{Re}\left\{ \sum_{k=0}^{\frac{N}{4}-1} x_i(k)x_i^*(k-1) \right\}.$$

The operation of Equations (3) and (4) are described in more detail below. In certain embodiments, N-symbol slice 410 of received signal 400 according to sync point hypothesis m may be divided into one or more segments. N-symbol slice 410 may be divided into any suitable number of segments. For example, in certain embodiments N-symbol slice 410 may be divided into N/4 segments.

Figure 5:
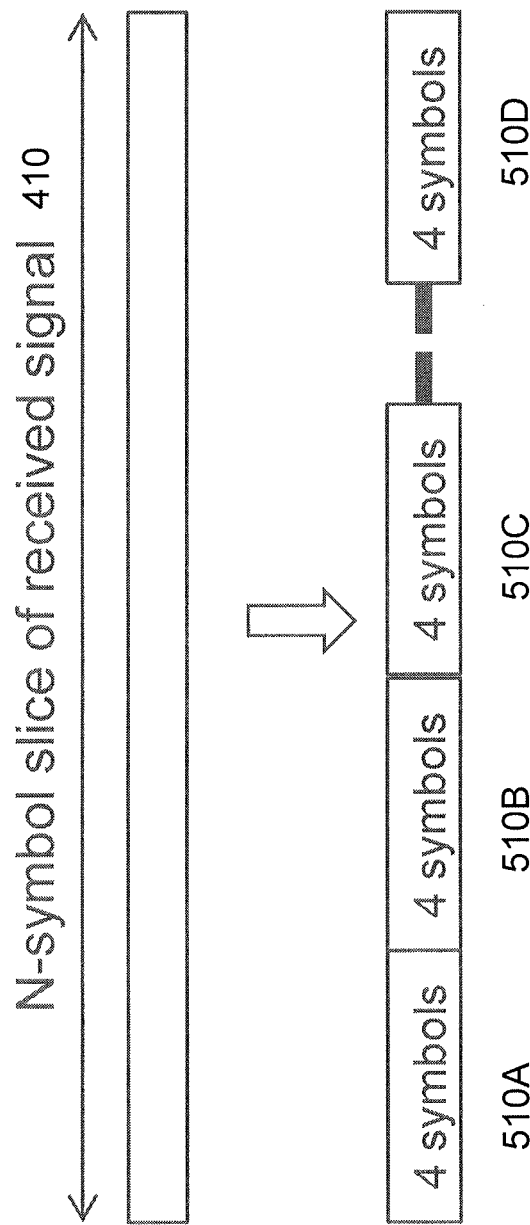
FIG. 5 illustrates an N-symbol slice of the received signal divided into segments.

FIG. 5 illustrates N-symbol slice 410 of received signal 400 divided into a plurality of segments 510A, 510B, 510C, and 510D. The one or more segments 510A-510D of N-symbol slice 410 of received signal 400 may be any suitable length. For example, and as illustrated in FIG. 5, each segment 510A-510D may be four symbols long. Although FIG. 5 illustrates a particular number of segments having a particular length, the present disclosure contemplates that N-symbol slice 410 may be divided into any suitable number of segments of any suitable length. In certain embodiments, each segment 510A-510D may have the same symbol length.

In certain embodiments, coherent correlation may be performed within each segment 510A-510D of N-symbol slice 410. The coherent correlation may be performed according to Equation (4) described above. A phase-rotation operator $\phi_i(l)$ may be applied during coherent correlation. In certain embodiments, the phase-rotation operator $\phi_i(l)$ may compensate for phase rotation introduced by the initial frequency error $f_o$ as described in Equation (1) above. The value of the initial frequency error $f_o$, however, is generally not known to the receiver during time synchronization. As a result, a number of frequency error hypotheses may be used.

To illustrate, let P be the number of frequency error hypotheses, and let $f_i$, i=0, 1, . . . , P−1, be the frequency errors for the ith hypothesis. Ideally, $\phi_i(l)=e^{-j2\pi l f_i T_s}$, as this phase rotation will perfectly compensate for the phase rotation introduced by the initial frequency error if the ith frequency error hypothesis is equal to the actual frequency error. Phase rotation involves multiplying two complex values, and operations as such however are not desirable due to complexity. Thus, in certain embodiments, the values of $e^{-j2\pi l f_i T_s}$ may be quantized to four points on the same unit circle, namely 1, −1, j, and −j. Multiplying received samples with 1, −1, j, or −j is significantly less complex. This may be advantageous in that it reduces the complexity in the receiver.

For example, in BLE/BLR, the initial frequency error (frequency offset plus frequency drift) may be in the interval of [−325, 325] kHz. Assume that eight frequency error hypotheses are used, such that P=8, where P is the number of frequency error hypotheses. The uncertainty interval of [−325, 325] kHz can be divided into 8 regions, with each region represented by a frequency error hypothesis. In this case, $f_0$=−284375 Hz, $f_1$=−203125 Hz, $f_2$=−121875 Hz, $f_3$=−40625 Hz, $f_4$=40625 Hz, $f_5$=121875 Hz, $f_6$=203125 Hz, and $f_7$=284375 Hz. When a frequency hypothesis is close to the actual initial frequency error, the residual frequency error will be small. Thus, there will be minor detrimental effect due to coherent correlation according to Equation (4).

In the example described above, the phase rotations according to these frequency error hypotheses are:
For $f_0$=−284375, (1.0000+0.0000i, −0.2143+0.9768i, −0.9081−0.4187i, 0.6036−0.7973i).
For $f_1$=−203125, (1.0000+0.0000i 0.2903+0.9569i−0.8315+0.5556i−0.7730−0.6344i).
For $f_2$=−121875, (1.0000+0.0000i 0.7209+0.6931i 0.0393+0.9992i−0.6643+0.7475i).
For $f_3$=−40625, (1.0000+0.0000i 0.9676+0.2525i 0.8725+0.4886i 0.7209+0.6931i).

For $f_4$=40625, (1.0000+0.0000i 0.9676−0.2525i 0.8725−0.4886i 0.7209−0.6931 i).
For $f_5$=121875, (1.0000+0.0000i 0.7209−0.6931i 0.0393−0.9992i−0.6643−0.7475i).
For $f_6$=203125, (1.0000+0.0000i 0.2903−0.9569i−0.8315−0.5556i−0.7730+0.6344i).
For $f_7$=284375, (1.0000+0.0000i−0.2143−0.9768i−0.9081+0.4187i 0.6036+0.7973i).
Here each of the 4-element row vectors represents the values of $\phi_i(l)$ for l=0, 1, 2, 3.

As described above, in certain embodiments the phase rotations may be quantized, avoiding the complex operations involved in phase rotation. For example, the phase rotations $f_0$ to $f_7$ described above may be quantized to 1, −1, j, and −j. Thus,
For $f_0$=−284375, (1, j, −1, −j).
For $f_1$=−203125, (1, j, −1, −1).
For $f_2$=−121875, (1, 1, j, j).
For $f_3$=−40625, (1, 1, 1, 1).
For $f_4$=40625, (1, 1, 1, 1).
For $f_5$=121875, (1, 1, −j, −j).
For $f_6$=203125, (1, −j, −1, −1).
For $f_7$=284375, (1, −j, −1, j).
Phase rotation operations using these special quantized values result in much reduced complexity.

Having determined the phase rotations, coherent correlation according to Equation (4) described above may be performed using the phase-rotation operator $\phi_i(l)$. Using the quantized phase-rotation values in coherent correlation boosts the SNR in the coherently combined values $x_i(k)$. Differentially coherent correlation may then be performed according to Equation (3) described above using $x_i(k)$. Since the SNR is boosted, differentially coherent correlation will perform well.

In certain embodiments, this process may be performed in an iterative manner. As described above, a plurality of N-symbol slices of the received signal may be determined. Each N-symbol slice may correspond to a sync point hypothesis. The steps described above may be performed for each determined N-symbol slice corresponding to a sync point hypotheses. When all the time synchronization metrics $c_i(m)$ have been computed for all frequency hypotheses $f_i$ and all sync point hypotheses m, a determination of the synchronization point may be made. The synchronization point may be determined in any suitable manner. For example, in certain embodiments, the combination of frequency error hypothesis $f_i$ and sync point hypothesis m that corresponds to the largest time synchronization metric may be determined as the frequency error estimate and time sync point.

Figure 6:
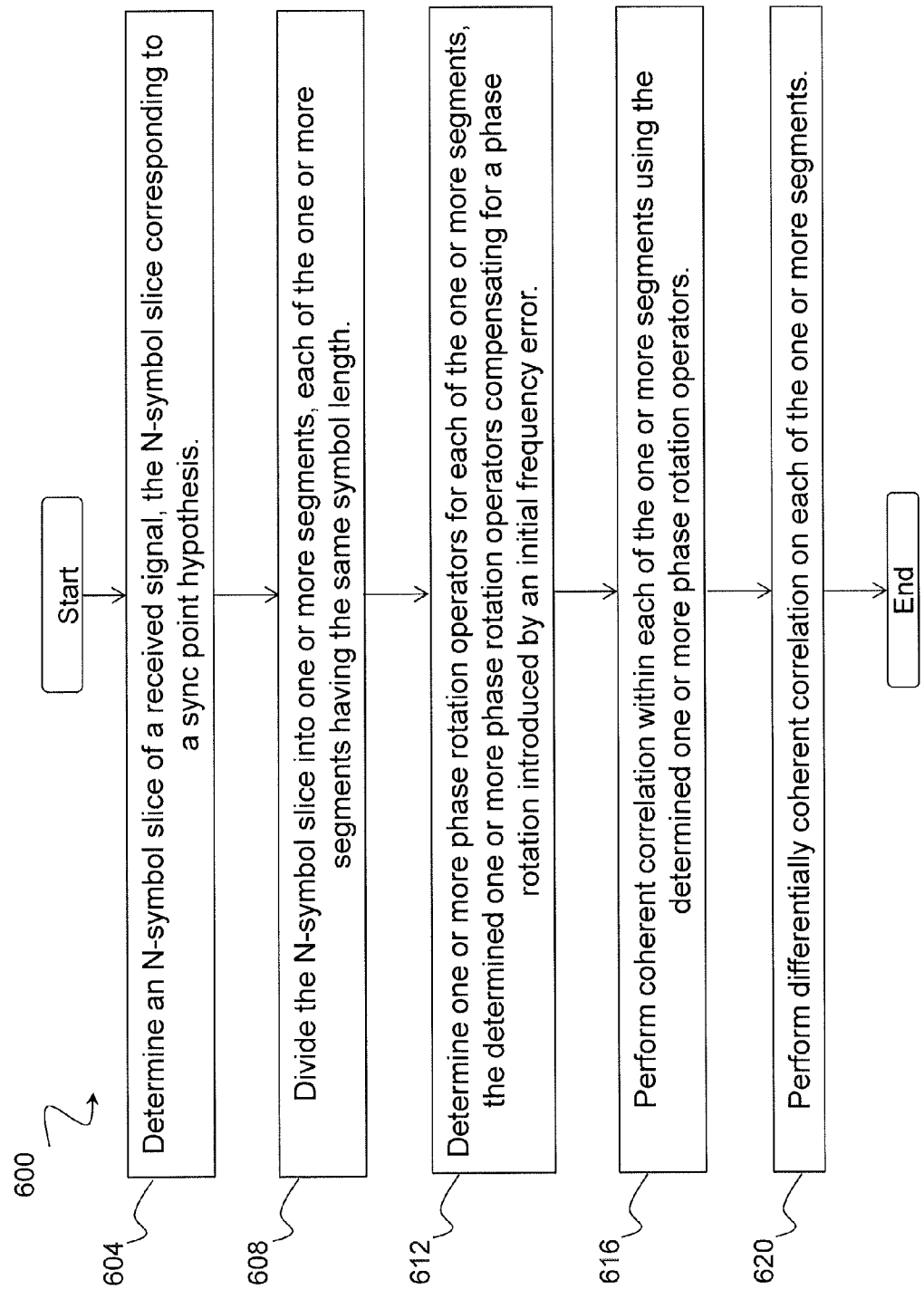
FIG. 6 is a flow diagram of a method for synchronization, in accordance with certain embodiments.

FIG. 6 is a flow diagram of a method, in accordance with certain embodiments. In certain embodiments, the method may be performed in a network node. The network node may comprise a Bluetooth Low Energy Long Range receiver. In certain embodiments, the method may be performed in a user equipment. The user equipment may comprise a Bluetooth Low Energy Long Range receiver. The method begins at step 604, where a an N-symbol slice of a received signal is determined. The N-symbol slice corresponds to a sync point hypothesis.

At step 608, the N-symbol slice is divided into one or more segments, each of the one or more segments having the same symbol length. At step 612, one or more phase rotation operators are determined for each of the one or more segments, the determined one or more phase rotation operators compensating for a phase rotation introduced by an initial frequency error. In certain embodiments, the one or more phase rotation operators for each of the one or more segments may be determined by determining an initial frequency error interval, dividing the determined initial frequency error interval into one or more frequency error hypotheses, determining a phase rotation for each of the one or more frequency error hypotheses, and quantizing the determined phase rotation for each of the one or more frequency error hypotheses. The determined phase rotation for each of the one or more frequency error hypotheses may be quantized by quantizing to four points on the same unit circle, the four points comprising 1, −1, j, and −j. In certain embodiments, step 612 may be performed once, and the determined one or more phase rotation operators may be reused for other sync point hypotheses.

At step 616, coherent correlation is performed within each of the one or more segments using the determined one or more phase rotation operators. In certain embodiments, performing coherent correlation within each of the one or more segments using the determined one or more phase rotation operators boosts an effective signal-to-noise ratio of the received signal by a processing gain. At step 620, differentially coherent correlation is performed on each of the one or more segments.

In certain embodiments, the N-symbol slice corresponding to the sync point hypothesis may be one of a plurality of N-symbol slices, each N-symbol slice having a corresponding sync point hypothesis. The method may further comprise performing, for each of the plurality of N-symbol slices, the steps of dividing the N-symbol slice into one or more segments, determining one or more phase rotation operators for each of the one or more segments, performing coherent correlation within each of the one or more segments using the determined differentially coherent correlation on each of the one or more segments. A frequency error hypothesis and sync point hypothesis combination having a largest time synchronization metric may be determined as a frequency error estimate and a time sync point. The time synchronization metric may be a correlation value. The correlation value may be based at least in part on a comparison of one of the plurality of N-symbol slices and a sync word of the received signal. In certain embodiments, one or more symbols corresponding to the sync word of the received signal may be determined based at least in part on a modulation index of the received signal.

Figure 7:
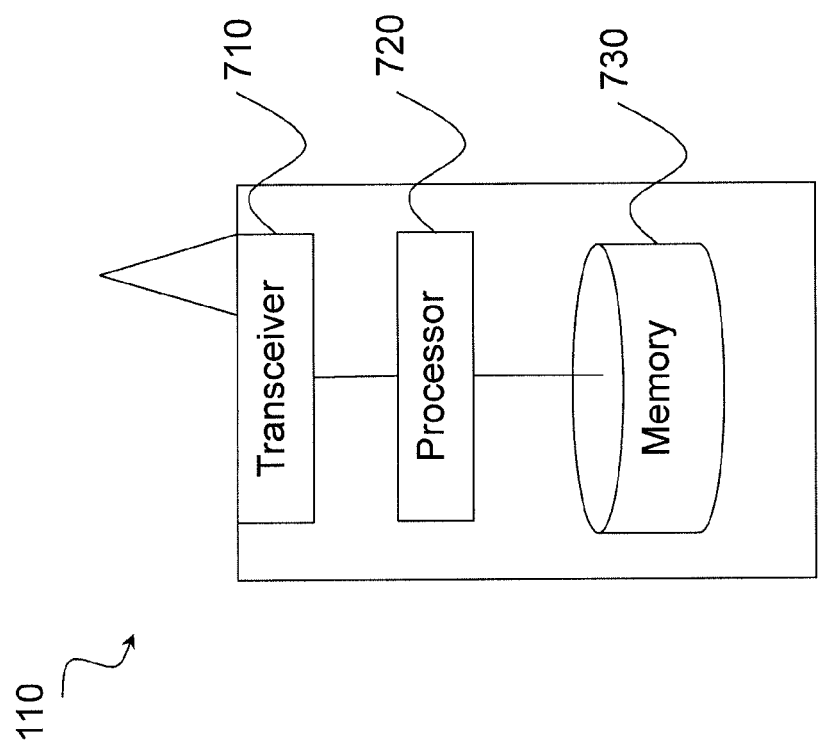
FIG. 7 is a block schematic of an exemplary wireless device, in accordance with certain embodiments.

FIG. 7 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine to machine (M2M) device, laptop embedded equipment (LEE), laptop mounted equipment (LME), USB dongles, a device-to-device capable device, or another device that can provide wireless communication. Wireless device 110 may be BLE and/or BLR capable. Thus, wireless device 110 may contain any suitable configuration of hardware and/or software for performing the various functionalities of BLE and/or BLR. For example, wireless device 110 may include a receiver and one or more processors configured to perform synchronization as described above.

A wireless device 110 may also be referred to as a UE, a station (STA), a device, or a terminal in some embodiments. Wireless device 110 includes transceiver 710, processor 720, and memory 730. In some embodiments, transceiver 710 facilitates transmitting wireless signals to and receiving wireless signals from network node 115 (e.g., via an antenna), processor 720 executes instructions to provide some or all of the functionality described above as being provided by wireless device 110, and memory 730 stores the instructions executed by processor 720.

Processor 720 may include any suitable combination of hardware and software implemented in one or more modules to execute instructions and manipulate data to perform some or all of the described functions of wireless device 110. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 7 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. For example, the determining module may perform synchronization as described above. For example, the determining module may determine an N-symbol slice of a received signal, divide the N-symbol slice into one or more segments, and determine one or more phase rotation operators for each of the one or more segments. The determining module may perform coherent correlation within each of the one or more segments using the determined one or more phase rotation operators, and perform differentially coherent correlation on each of the one or more segments. As another example, the determining module may determine a frequency error hypothesis and sync point hypothesis combination having a largest time synchronization metric as a frequency error estimate and a time sync point. As yet another example, the determining module may determine one or more symbols corresponding to the sync word of the received signal based at least in part on a modulation index of the received signal. The determining module may include or be included in processor 720. The determining module may include analog and/or digital circuitry configured to perform any of the functions of the determining module and/or processor 720. The functions of the determining module described above may, in certain embodiments, be performed in one or more distinct modules.

The communication module may perform the transmission functions of wireless device 110. The communication module may transmit messages to one or more of network nodes 115 or wireless devices 110 of network 100. The communication module may include a transmitter and/or a transceiver, such as transceiver 710. The communication module may include circuitry configured to wirelessly transmit messages and/or signals. In particular embodiments, the communication module may receive messages and/or signals for transmission from the determining module. In certain embodiments, the communication module may communicate a signal to a BLE and/or BLR capable receiver.

The receiving module may perform the receiving functions of wireless device 110. The receiving module may include a receiver and/or a transceiver. The receiving module may include circuitry configured to wirelessly receive messages and/or signals. In particular embodiments, the receiving module may communicate received messages and/or signals to the determining module. In certain embodiments, the receiving module may receive a signal having a large initial frequency error.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 8:
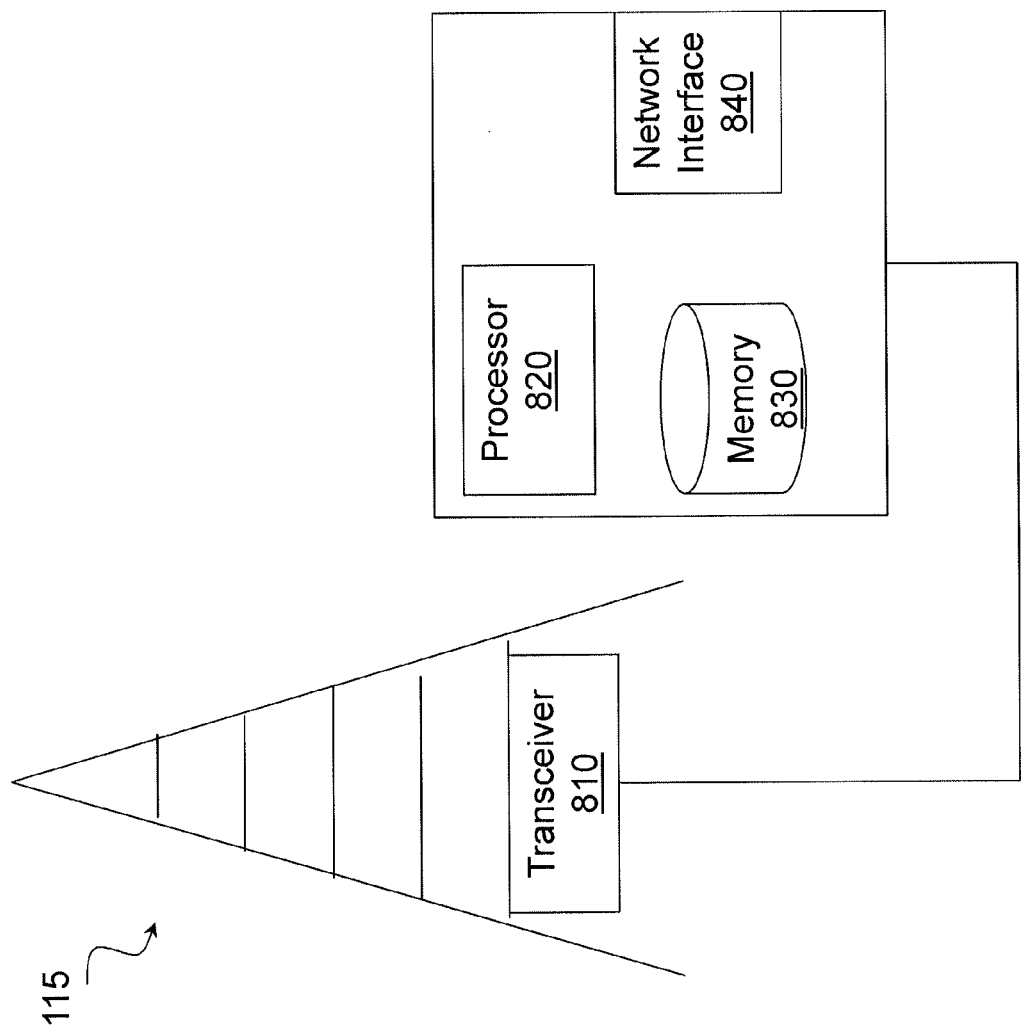
FIG. 8 is a block schematic of an exemplary network node, in accordance with certain embodiments.

FIG. 8 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network node 115 may be BLE and/or BLR capable. Thus, network node 115 may contain any suitable configuration of hardware and/or software for performing the various functionalities of BLE and/or BLR. For example, network node 115 may include a receiver and one or more processors configured to perform synchronization as described above.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processor 820, memory 830, and network interface 840. In some embodiments, transceiver 810 facilitates transmitting wireless signals to and receiving wireless signals from wireless device 110 (e.g., via an antenna), processor 820 executes instructions to provide some or all of the functionality described above as being provided by a network node 115, memory 830 stores the instructions executed by processor 820, and network interface 840 communicates signals to backend network components, such as a gateway, switch, router, Internet, Public Switched Telephone Network (PSTN), core network nodes, radio network controllers, etc.

Processor 820 may include any suitable combination of hardware and software implemented in one or more modules to execute instructions and manipulate data to perform some or all of the described functions of network node 115. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, network interface 840 is communicatively coupled to processor 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

In certain embodiments, network node 115 may include a communication module, a receiving module, a determining module, and any other suitable modules. In some embodiments, one or more of the communication module, receiving module, determining module, or any other suitable module may be implemented using one or more processors 820 of FIG. 8.

In general, the communication module may perform the transmission functions of network node 115. The communication module may transmit messages and/or signals to one or more of wireless devices 110. For example, the communication module may communicate a signal to a BLE/BLR capable receiver. The communication module may include a transmitter and/or a transceiver, such as transceiver 810. The communication module may include circuitry configured to wirelessly transmit messages and/or signals.

The receiving module may perform the receiving functions of network node 115. The receiving module may receive any suitable information from a wireless device 110. For example, the receiving module may receive a signal having a large initial frequency error. The receiving module may include a receiver and/or a transceiver. The receiving module may include circuitry configured to wirelessly receive messages and/or signals. In particular embodiments, the receiving module may communicate received messages and/or signals to the determining module.

The determining module may perform the processing functions of network node 115. For example, the determining module may perform synchronization as described above. For example, the determining module may determine an N-symbol slice of a received signal, divide the N-symbol slice into one or more segments, and determine one or more phase rotation operators for each of the one or more segments. The determining module may perform coherent correlation within each of the one or more segments using the determined one or more phase rotation operators, and perform differentially coherent correlation on each of the one or more segments. As another example, the determining module may determine a frequency error hypothesis and sync point hypothesis combination having a largest time synchronization metric as a frequency error estimate and a time sync point. As yet another example, the determining module may determine one or more symbols corresponding to the sync word of the received signal based at least in part on a modulation index of the received signal. The determining module may include or be included in processor 720. The determining module may include analog and/or digital circuitry configured to perform any of the functions of the determining module and/or processor 720. The functions of the determining module described above may, in certain embodiments, be performed in one or more distinct modules. In certain embodiments, the functions of two or more of the various modules may be combined into a single module.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
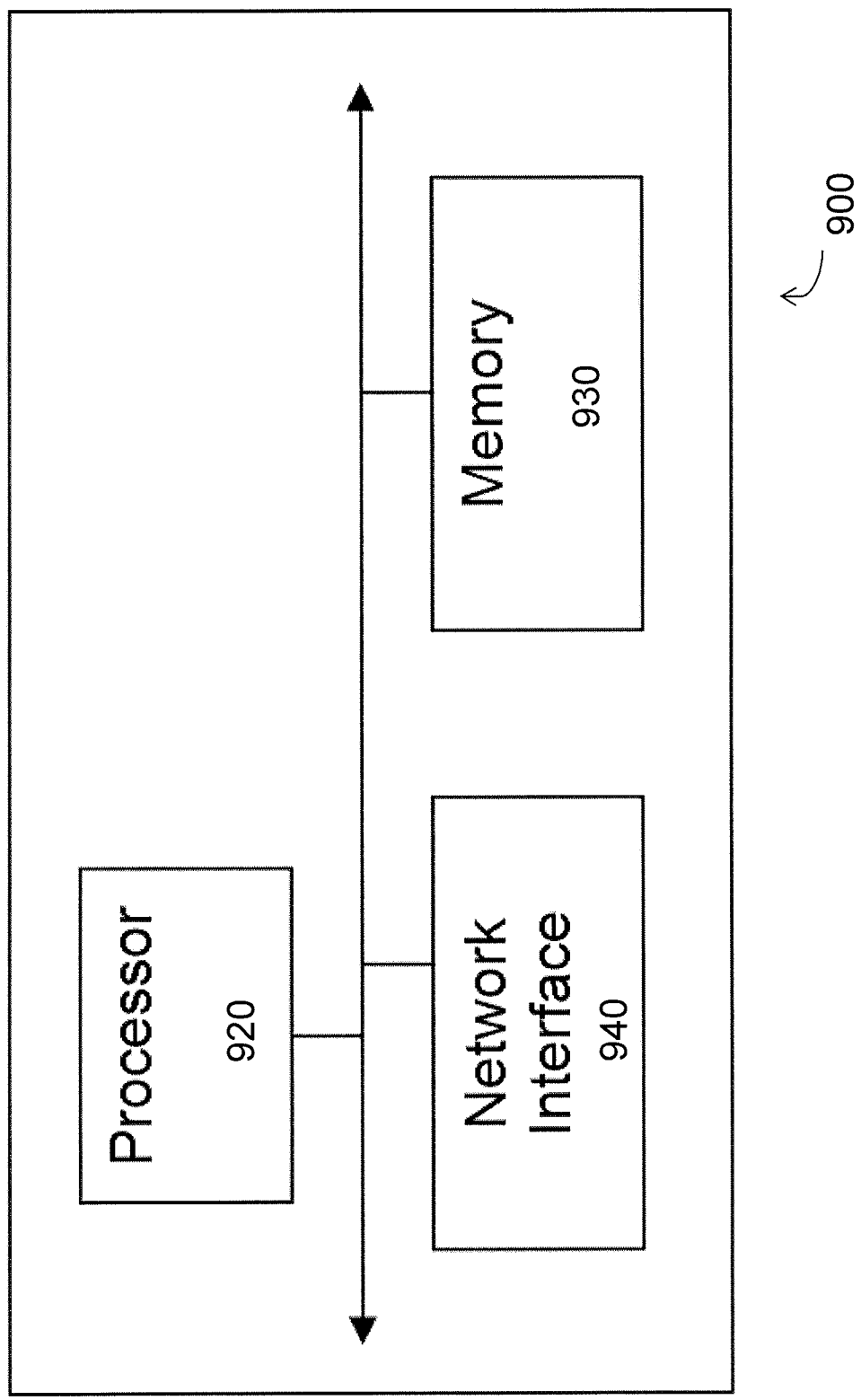
FIG. 9 is a block schematic of an exemplary radio network controller or core network node, in accordance with certain embodiments.

FIG. 9 is a block schematic of an exemplary radio network controller or core network node 900, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 900 include processor 920, memory 930, and network interface 940. In some embodiments, processor 920 executes instructions to provide some or all of the functionality described above as being provided by the network node, memory 930 stores the instructions executed by processor 920, and network interface 940 communicates signals to any suitable node, such as a gateway, switch, router, Internet, Public Switched Telephone Network (PSTN), network nodes 115, radio network controllers or core network nodes 900, etc.

Processor 920 may include any suitable combination of hardware and software implemented in one or more modules to execute instructions and manipulate data to perform some or all of the described functions of the radio network controller or core network node 900. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Modifications, additions, or omissions may be made to the systems and apparatuses disclosed herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
BLE Bluetooth Low Energy
BLR Bluetooth Low Energy Long Range
FEC Forward Error Correction
GFSK Gaussian Frequency Shift Keying
LEE Laptop Embedded Equipment
LME Laptop Mounted Equipment
M2M Machine to Machine
MTC Machine Type Communications
SIG Special Interest Group
SNR Signal-to-noise ratio
STA Station
UE User Equipment

The invention claimed is:

1. A method for synchronization in a network node, comprising:

determining an N-symbol slice of a received signal, the N-symbol slice corresponding to a sync point hypothesis;

dividing the N-symbol slice into one or more segments, each of the one or more segments having the same symbol length;

determining one or more phase rotation operators for each of the one or more segments, the determined one or more phase rotation operators compensating for a phase rotation introduced by an initial frequency error, wherein determining one or more phase rotation operators for each of the one or more segments further comprises:

determining an initial frequency error interval;

dividing the determined initial frequency error interval into one or more frequency error hypotheses;

determining a phase rotation for each of the one or more frequency error hypotheses; and quantizing the determined phase rotation for each of the one or more frequency error hypotheses, wherein quantizing the determined phase rotation for each of the one or more frequency error hypotheses comprises quantizing to four points on the same unit circle, the four points comprising 1, −1, j, and -j;

performing coherent correlation within each of the one or more segments using the determined one or more phase rotation operators;

performing differentially coherent correlation on each of the one or more segments; and determining, based on the differentially coherent correlation performed on each of the one or more segments, at least one of a time synchronization point and a frequency synchronization point for the received signal.

2. The method of claim 1:

wherein the N-symbol slice corresponding to the sync point hypothesis is one of a plurality of N-symbol slices, each N-symbol slice having a corresponding sync point hypothesis;

further comprising:

performing, for each of the plurality of N-symbol slices, the steps of dividing the N-symbol slice into one or more segments, determining one or more phase rotation operators for each of the one or more segments, performing coherent correlation within each of the one or more segments using the determined one or more phase rotation operators, and performing differentially coherent correlation on each of the one or more segments; and determining a frequency error hypothesis and sync point hypothesis combination having a largest time synchronization metric as a frequency error estimate and a time sync point.

3. The method of claim 2, wherein the time synchronization metric is a correlation value, the correlation value based at least in part on a comparison of one of the plurality of N-symbol slices and a sync word of the received signal.

4. The method of claim 3, further comprising determining one or more symbols corresponding to the sync word of the received signal based at least in part on a modulation index of the received signal.

5. The method of claim 1, wherein the frequency error interval comprises a frequency offset and a frequency drift.

6. The method of claim 1, wherein the step of performing coherent correlation within each of the one or more segments using the determined one or more phase rotation operators boosts an effective signal-to-noise ratio of the received signal by a processing gain.

7. The method of claim 1, wherein the network node comprises a Bluetooth Low Energy Long Range receiver.

8. A method for synchronization in a user equipment, comprising:
   determining an N-symbol slice of a received signal, the N-symbol slice corresponding to a sync point hypothesis;
   dividing the N-symbol slice into one or more segments, each of the one or more segments having the same symbol length;
   determining one or more phase rotation operators for each of the one or more segments, the determined one or more phase rotation operators compensating for a phase rotation introduced by an initial frequency error, wherein determining one or more phase rotation operators for each of the one or more segments further comprises:
      determining an initial frequency error interval;
      dividing the determined initial frequency error interval into one or more frequency error hypotheses;
      determining a phase rotation for each of the one or more frequency error hypotheses; and
      quantizing the determined phase rotation for each of the one or more frequency error hypotheses, wherein quantizing the determined phase rotation for each of the one or more frequency error hypotheses comprises quantizing to four points on the same unit circle, the four points comprising 1, −1, j, and -j;
   performing coherent correlation within each of the one or more segments using the determined one or more phase rotation operators;
   performing differentially coherent correlation on each of the one or more segments; and
   determining, based on the differentially coherent correlation performed on each of the one or more segments, at least one of a time synchronization point and a frequency synchronization point for the received signal.

9. The method of claim 8:
   wherein the N-symbol slice corresponding to the sync point hypothesis is one of a plurality of N-symbol slices, each N-symbol slice having a corresponding sync point hypothesis;
   further comprising:
      performing, for each of the plurality of N-symbol slices, the steps of dividing the N-symbol slice into one or more segments, determining one or more phase rotation operators for each of the one or more segments, performing coherent correlation within each of the one or more segments using the determined one or more phase rotation operators, and performing differentially coherent correlation on each of the one or more segments; and
      determining a frequency error hypothesis and sync point hypothesis combination having a largest time synchronization metric as a frequency error estimate and a time sync point.

10. The method of claim 9, wherein the time synchronization metric is a correlation value, the correlation value based at least in part on a comparison of one of the plurality of N-symbol slices and a sync word of the received signal.

11. The method of claim 10, further comprising determining one or more symbols corresponding to the sync word of the received signal based at least in part on a modulation index of the received signal.

12. The method of claim 8, wherein the frequency error interval comprises a frequency offset and a frequency drift.

13. The method of claim 8, wherein the step of performing coherent correlation within each of the one or more segments using the determined one or more phase rotation operators boosts an effective signal-to-noise ratio of the received signal by a processing gain.

14. The method of claim 8, wherein the user equipment comprises a Bluetooth Low Energy Long Range receiver.

15. A network node, comprising:
   a memory; and
   one or more processors, the one or more processors configured to:
   determine an N-symbol slice of a received signal, the N-symbol slice corresponding to a sync point hypothesis;
   divide the N-symbol slice into one or more segments, each of the one or more segments having the same symbol length;
   determine one or more phase rotation operators for each of the one or more segments, the determined one or more phase rotation operators compensating for a phase rotation introduced by an initial frequency error, wherein the one or more processors configured to determine one or more phase rotation operators for each of the one or more segments comprises one or more processors configured to:
   determine an initial frequency error interval;
   divide the determined initial frequency error interval into one or more frequency error hypotheses;
   determine a phase rotation for each of the one or more frequency error hypotheses; and
   quantize the determined phase rotation for each of the one or more frequency error hypotheses, wherein the one or more processors configured to quantize the determined phase rotation for each of the one or more frequency error hypotheses comprises one or more processors configured to quantize to four points on the same unit circle, the four points comprising 1, −1, j, and -j;
   perform coherent correlation within each of the one or more segments using the determined one or more phase rotation operators;
   perform differentially coherent correlation on each of the one or more segments; and
   determine, based on the differentially coherent correlation performed on each of the one or more segments, at least one of a time synchronization point and a frequency synchronization point for the received signal.

16. The network node of claim 15:
   wherein the N-symbol slice corresponding to the sync point hypothesis is one of a plurality of N-symbol slices, each N-symbol slice having a corresponding sync point hypothesis;
   the one or more processors further configured to:
      perform, for each of the plurality of N-symbol slices, the steps of dividing the N-symbol slice into one or more segments, determining one or more phase rotation operators for each of the one or more segments, performing coherent correlation within each of the one or more segments using the determined one or more phase rotation operators, and performing differentially coherent correlation on each of the one or more segments; and
      determine a frequency error hypothesis and sync point hypothesis combination having a largest time synchronization metric as a frequency error estimate and a time sync point.

17. The network node of claim 16, wherein the time synchronization metric is a correlation value, the correlation value based at least in part on a comparison of one of the plurality of N-symbol slices and a sync word of the received signal.

18. The network node of claim 17, wherein the one or more processors are further configured to determine one or more symbols corresponding to the sync word of the received signal based at least in part on a modulation index of the received signal.

19. The network node of claim 15, wherein the frequency error interval comprises a frequency offset and a frequency drift.

20. The network node of claim 15, wherein the one or more processors configured to perform coherent correlation within each of the one or more segments using the determined one or more phase rotation operators boosts an effective signal-to-noise ratio of the received signal by a processing gain.

21. The network node of claim 15, wherein the network node comprises a Bluetooth Low Energy Long Range receiver.

22. A user equipment, comprising:
a memory; and
one or more processors, the one or more processors configured to:
determine an N-symbol slice of a received signal, the N-symbol slice corresponding to a sync point hypothesis;
divide the N-symbol slice into one or more segments, each of the one or more segments having the same symbol length;
determine one or more phase rotation operators for each of the one or more segments, the determined one or more phase rotation operators compensating for a phase rotation introduced by an initial frequency error, wherein the one or more processors configured to determine one or more phase rotation operators for each of the one or more segments comprises one or more processors configured to:
determine an initial frequency error interval;
divide the determined initial frequency error interval into one or more frequency error hypotheses;
determine a phase rotation for each of the one or more frequency error hypotheses; and
quantize the determined phase rotation for each of the one or more frequency error hypotheses, wherein the one or more processors configured to quantize the determined phase rotation for each of the one or more frequency error hypotheses comprises one or more processors configured to quantize to four points on the same unit circle, the four points comprising 1, −1, j, and -j;

perform coherent correlation within each of the one or more segments using the determined one or more phase rotation operators;
perform differentially coherent correlation on each of the one or more segments; and
determine, based on the differentially coherent correlation performed on each of the one or more segments, at least one of a time synchronization point and a frequency synchronization point for the received signal.

23. The user equipment of claim 22:
wherein the N-symbol slice corresponding to the sync point hypothesis is one of a plurality of N-symbol slices, each N-symbol slice having a corresponding sync point hypothesis;
the one or more processors further configured to:
perform, for each of the plurality of N-symbol slices, the steps of dividing the N-symbol slice into one or more segments, determining one or more phase rotation operators for each of the one or more segments, performing coherent correlation within each of the one or more segments using the determined one or more phase rotation operators, and performing differentially coherent correlation on each of the one or more segments; and
determine a frequency error hypothesis and sync point hypothesis combination having a largest time synchronization metric as a frequency error estimate and a time sync point.

24. The user equipment of claim 23, wherein the time synchronization metric is a correlation value, the correlation value based at least in part on a comparison of one of the plurality of N-symbol slices and a sync word of the received signal.

25. The user equipment of claim 24, wherein the one or more processors are further configured to determine one or more symbols corresponding to the sync word of the received signal based at least in part on a modulation index of the received signal.

26. The user equipment of claim 22, wherein the frequency error interval comprises a frequency offset and a frequency drift.

27. The user equipment of claim 22, wherein the one or more processors configured to perform coherent correlation within each of the one or more segments using the determined one or more phase rotation operators boosts an effective signal-to-noise ratio of the received signal by a processing gain.

28. The user equipment of claim 22, wherein the user equipment comprises a Bluetooth Low Energy Long Range receiver.

* * * * *